Patented Aug. 13, 1935

2,010,819

UNITED STATES PATENT OFFICE 2,010,819

TREATMENT OF OIL-WAX MIXTURES

Joseph Bennett Hill, Wynnewood, Pa., assignor to The Atlantic Refining Company, Philadelphia, Pa., a corporation of Pennsylvania No Drawing. Application December 1, 1932, Serial No. 645,236

15 Claims. (Cl. 196—20)

This invention relates to the separation of substances of different fusibility, and more particularly, to the separation from waxes of oils.

A special object of my invention is to separate oleaginous components of mineral origin, such as components of petroleum, or of petroleum fractions of different fusibility, and particularly oil from mineral wax and/or lower melting from higher melting mineral wax. Hereinafter, the term "oil" will be used in a generic sense to include both oil and liquid low-melting wax.

A commonly employed method for separating oil and/or low melting wax from higher melting wax is by "sweating". Such method consists essentially in (1) bringing the oil-wax or wax mixture to a temperature sufficiently low to solidify it, and (2) frictionally melting and draining portions thereof from the portion that remains solid. In lieu of "sweating" wherein air may be and usually is employed as the medium which surrounds the oil-wax mixture during the operation, the removal of oil and/or low melting wax from the crude wax cake, in accordance with prior teachings, may be accomplished by surrounding the wax cake with water, the temperature of which is suitably controlled, to obtain the desired fractionation of products to be melted and removed.

As one aspect of my invention, I have found that if in lieu of water, aqueous solutions of alkali metal phosphates are employed, decidedly superior results may be attained. Such phosphates may be mono-phosphates, di-phosphates, and/or tri-phosphates. When, for example, these solutions are employed as the medium to surround a crude wax cake undergoing sweating, the rate of sweating of the wax is markedly increased, and solid wax of relatively high melting point results. In lieu of the phosphates that I prefer to employ, viz., the sodium phosphates, it will be understood that my invention comprehends employment of potassium phosphate salts, or other alkali phosphate salts of like or similar character.

The beneficial effects of solutions of salts of the class above noted may be illustrated by the following examples:

A crude wax, i. e., a slack wax, obtained from a typical Mid-Continent crude, having a melting point of 37.6° C., was first slowly cooled from a liquid state to −5° C., the cooling taking place over a period of approximately 23 hours, to cause it to solidify. Equal volume cakes of the solid crude wax were surrounded with (1) water, and (2) a 10% commercial tri-sodium phosphate solution. Each was kept at the same temperature within the range of from substantially 27° C. to 32° C., for a period of approximately 116 hours.

In the case of the water, there was no appreciable separation of oil from wax, the melting point of the wax at the end of the treatment being substantially the same as that of the original crude wax. Further, there was only a diminution of 2% in the weight of the wax.

With the tri-sodium phosphate solution, the solid wax remaining equalled 29.5% by weight of the original crude wax, and had a melting point of 49.5° C., a rise in melting point of 11.9° C. over that of the crude wax.

Employing some additional sweating agents and a slightly different design of sweating apparatus, but substantially the same temperature conditions and identically the same crude wax as above, the following results were obtained. The surrounding media employed were (1) water, (2) a 10% aqueous solution of commercial tri-sodium phosphate, (3) an aqueous solution containing 10% of substantially pure tri-sodium phosphate, and (4) a 10% aqueous solution of di-sodium phosphate.

As in the first example, no appreciable separation of more fusible from less fusible components was observed with water as the surrounding medium; that is, the wax remaining after the treatment, had substantially the same weight and melting point as that of the original crude wax. The other solutions, however, showed a strong influence as sweating promoters or sweating agents. The commercial tri-sodium phosphate solution yielded a wax equal to 28.5% by weight of the original crude wax and having a melting point of 50.8° C., a rise in melting point of 13.2° C., over that of the original crude wax. The solution of substantially pure tri-sodium phosphate yielded approximately the same quantity of wax, of approximately the same melting point, as that obtained with the commercial tri-sodium phosphate solution, the melting point thereof being raised 13.3° C. And the di-sodium phosphate solution yielded a wax equal to 36% by weight of the original crude wax, having a melting point of 47.0° C., a rise in melting point of 9.4° C., over that of the crude wax.

Water alone in contact with or surrounding a crude wax during the sweating operation, as is shown above, is ineffective in aiding the sweating operation. The above examples indicate that alkali metal phosphates have a markedly beneficial effect upon and serve materially as an aid in the separation of oils from waxes and/or lower melting waxes from higher melting waxes.

The above data was obtained as a result of what is customarily specifically referred to as sweating. It is to be understood that my invention is of broader application, and it may be applied to various types of processes for separating oils from mineral waxes, or mineral wax from oils. For example, my invention may be applied in processes wherein, in lieu of starting with a solid and raising the temperature, as in sweating, the oil-wax mixture may be liquid and the temperature thereof may be lowered sufficiently to solidify portions thereof to be separated, as in the process disclosed in U. S. application Serial No. 545,813 filed on June 20, 1931, by Perkins et al.

As a result of my process, the product or products to no appreciable or at least substantial extent, are contaminated with alkali metal phosphates. In other words, the latter performs its function without permanent combination with the materials being treated, and consequently upon being separated from one batch of material may be used to treat another batch, and so on, indefinitely.

In separating, for example, a mineral wax from an oil, my invention broadly comprises bringing alkali phosphates, preferably in the form of aqueous solutions, into contact with the wax to be purified. Such solutions apparently have the property of lowering the surface or interfacial tension between the oil and wax. In other words, such solutions apparently interpose themselves between the oil and wax, without any appreciable dissolving of either, so that the oil will more easily detach itself from the wax.

In addition to employment in the sweating of wax, solutions of alkali phosphates may, in accordance with my invention, be employed to expedite the separation of wax from oil, as in the cold settling or centrifuging process, to produce an oil of lower cold test. Other problems involving the separation of mineral wax from oil, or the latter from the former, as will, in view of the above, become apparent to those skilled in the art as problems to which my invention may be applied, are of course, contemplated as a part thereof.

As regards the method of employing alkali phosphate solutions, it is to be understood that my invention contemplates processes in which separation of more fusible from less fusible portions of the substance being treated, is effected by raising or lowering the temperature, as the case necessitates. Whether the temperature be raised or lowered will, in any case, depend respectively upon whether the mixture to be separated is initially solid or liquid.

My invention includes segregating those fractions of the oil-wax mixture that separate within desired temperatures ranges, as for example, when employed in a process wherein a crude wax is fractionally sweated.

In the appended claims, the term "alkali phosphate" is to be understood to comprehend the secondary and tertiary ortho phosphates of the alkali metals or mixtures of two or more of them. Likewise, the term "sodium phosphate" when used in the claims is to comprehend the secondary and tertiary sodium ortho phosphates or mixtures thereof.

What I claim is:

1. In a process for separating a mineral oleaginous substance composed of portions of different fusibility into more fusible and less fusible portions respectively, the steps which comprise bringing together said substance and a solution of an alkali phosphate, effecting relative movement of the one with respect to the other to effect separation of liquid portions from solid portions of the substance, and regulating the temperature so that it will be above the solidification point of the more fusible portions and below the solidification point of the less fusible portions of said substance upon completion of the steps aforesaid.

2. In a process for separating a mineral waxy substance composed of portions of different fusibility into portions thereof which are respectively of higher fusibility and of lower fusibility than the said waxy substance, the steps which comprise surrounding the substance with a solution of an alkali phosphate by placing the substance below the surface of the solution, and controlling the temperature of the surrounding solution so that those portions of the substance which are to be separated, if not liquid, will be changed to liquid, and will exude from the portion which remains solid, and removing the exuded liquid from the solid.

3. The process for removing a liquid oleaginous film from the surface of a granular mineral oleaginous solid substance, which comprises lowering the attraction between the said liquid film and the surface of said granular solid by agitating the granular solid with a solution of an alkali phosphate, and during such agitation maintaining the solution at a temperature below the fusion point of the said granular solid and above the solidification point of the liquid to be removed, and thereafter removing the liquid from the solid.

4. The process for removing a liquid oleaginous film from the surface of a granular mineral wax, which comprises lowering the attraction between the said liquid film and the surface of said granular wax by surrounding the granular wax with a solution of an alkali phosphate by placing the wax below the surface of the solution, maintaining the surrounding solution at a temperature below the fusion point of said granular wax and above the solidification point of the liquid, and allowing said liquid film to separate by gravity.

5. The process for removing a liquid oleaginous film from the surface of a granular mineral wax, which comprises lowering the attraction between the said liquid film and the surface of said granular wax by surrounding the granular wax with a tri-sodium phosphate solution, by placing the wax below the surface of the solution, maintaining the surrounding solution at a temperature below the fusion point of the said granular wax and above the solidification point of the liquid, and allowing said liquid film to separate by gravity.

6. The process for separating a mineral oleaginous substance composed of portions of different fusibility into portions thereof which are respectively more fusible and less fusible, which comprises washing the more fusible portion from the less fusible portion with a solution of an alkali phosphate, and carrying out such washing at a temperature below the fusion point of the less fusible portion.

7. The process for separating a mixture of lower melting from higher melting mineral waxes which comprises surrounding the mixture with an aqueous solution containing sodium phosphate, and gradually raising the temperature of the system sufficiently to cause the lower melting waxes to liquefy and exude from the solid higher melting waxes.

8. The process for separating from a mineral oleaginous substance composed of portions of different fusibility the more fusible portions thereof, which comprises surrounding said substance with a tri-sodium phosphate solution, gradually raising the temperature of the surrounding solution sufficiently to cause the more fusible portions to exude from the substance, and separately collecting successive portions which exude and separate from said substance as the temperature is raised.

9. A process for separating mineral wax from oil which comprises admixing the oil-wax mixture in a liquid condition with a solution of an alkali phosphate and gradually lowering the temperature of said solution whereby the less fusible wax is precipitated in solid form.

10. A process for separating oil from a mineral oil-wax mixture which comprises admixing the mixture in finely divided solid form with a solution of an alkali phosphate, gradually increasing the temperature of the admixture to cause oil to exude therefrom, and removing said exuded oil.

11. A process for separating oil from a mineral oil-wax mixture which comprises surrounding the mixture in solid form with a solution of tri-sodium phosphate by placing the mixture below the surface of the solution, and gradually increasing the temperature of the surrounding solution to cause oil to exude from the oil-wax mixture, and removing the exuded oil.

12. The process for separating from a mineral oleaginous substance composed of portions of different fusibility, the less fusible portions thereof, which comprises admixing the substance in a molten state with a solution of an alkali phosphate, gradually lowering the temperature of the admixture so formed to an extent sufficient to cause solidification of less fusible portions, and freeing more fusible portions from solidified less fusible portions.

13. A process for sweating oil and low melting mineral wax from higher melting mineral wax which comprises surrounding the crude wax cake to be sweated with a solution of an alkali phosphate, and maintaining the surrounding solution at a temperature such that those portions of the oil and wax which are to be separated from the higher melting wax are in a liquid state and will exude therefrom, and removing the exuded oil.

14. A process for sweating oil and low melting mineral wax from higher melting mineral wax which comprises surrounding the crude wax cake to be sweated with a solution of tri-sodium phosphate, and maintaining the surrounding solution at a temperature such that those portions of the oil and wax which are to be separated from the higher melting wax are in a liquid state and will exude therefrom, and removing the exuded oil.

15. A process for sweating oils and low melting mineral wax from higher melting mineral wax which comprises surrounding the crude wax cake with a solution of tri-sodium phosphate, raising the temperature of the surrounding solution so that those portions of the oil and wax which are to be separated from high melting wax are in a liquid state and will exude therefrom, and collecting portions which separate within desired temperature ranges.

JOSEPH BENNETT HILL.